United States Patent
Osuka et al.

(10) Patent No.: US 11,647,278 B2
(45) Date of Patent: May 9, 2023

(54) IMAGING APPARATUS

(71) Applicant: Panasonic Intellectual Property Management Co., Ltd., Osaka (JP)

(72) Inventors: Kyosuke Osuka, Osaka (JP); Masanori Koyama, Osaka (JP); Satoshi Horie, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/342,139

(22) Filed: Jun. 8, 2021

(65) Prior Publication Data

US 2022/0103759 A1    Mar. 31, 2022

(30) Foreign Application Priority Data

Sep. 25, 2020 (JP) .............................. JP2020-161430

(51) Int. Cl.
  *H04N 23/63*   (2023.01)
  *H04N 23/61*   (2023.01)
  *G06F 3/14*    (2006.01)

(52) U.S. Cl.
  CPC ......... *H04N 23/633* (2023.01); *G06F 3/1454* (2013.01); *H04N 23/61* (2023.01)

(58) Field of Classification Search
  CPC .......... G09G 2380/02; G02F 1/133305; G06F 3/0485; G06F 3/0482; G06F 3/1423; H04N 5/225
  USPC ................. 396/141, 148–152; 345/173–178; 348/333.01, 341
  See application file for complete search history.

(56) References Cited

U.S. PATENT DOCUMENTS

| | | | |
|---|---|---|---|
| 11,210,049 B2 * | 12/2021 | Gong | G09G 5/14 |
| 2004/0005497 A1 | 1/2004 | Nunomaki | |
| 2007/0057866 A1 * | 3/2007 | Lee | H04M 1/0218 348/E7.079 |
| 2009/0115880 A1 | 5/2009 | Wada | |
| 2010/0328492 A1 * | 12/2010 | Fedorovskaya | G06V 10/462 348/231.2 |
| 2011/0285645 A1 * | 11/2011 | Cho | G06F 3/041661 345/173 |
| 2012/0062693 A1 | 3/2012 | Hada | |
| 2013/0083228 A1 * | 4/2013 | Iwatani | H04N 5/225 348/333.01 |
| 2018/0041712 A1 | 2/2018 | Nakagawara | |

FOREIGN PATENT DOCUMENTS

| JP | H10-126655 A | 5/1998 |
|---|---|---|
| JP | 2001-257911 A | 9/2001 |

(Continued)

*Primary Examiner* — Xi Wang
(74) *Attorney, Agent, or Firm* — Renner, Otto, Boisselle & Sklar, LLP

(57) ABSTRACT

An imaging apparatus for capturing an image of a subject, the imaging apparatus includes: a first display; a second display including a display screen configured to change an orientation toward a subject side; a controller configured to control operations of the first and second displays; and a proximity detector configured to detect an object in proximity to the first display, wherein when a predetermined condition is satisfied, the controller causes the first display to display an image of the subject, and causes the second display to display an image showing the subject simultaneously with the first display.

12 Claims, 10 Drawing Sheets

(56) References Cited

FOREIGN PATENT DOCUMENTS

| | | |
|---|---|---|
| JP | 2004-048986 A | 2/2004 |
| JP | 2004-184293 A | 7/2004 |
| JP | 2009-117993 A | 5/2009 |
| JP | 2012-060510 A | 3/2012 |
| JP | 2018-022115 A | 2/2018 |

\* cited by examiner

IMAGING APPARATUS

BACKGROUND

1. Technical Field

The present disclosure relates to an imaging apparatus including a plurality of displays.

2. Related Art

JP 2001-257911 A discloses a camera in which a front side display for image display is provided on the front side of the camera body, and a back side display for image display is also provided on the back side of the camera body. The camera of JP 2001-257911 A is configured so that a photographer's operation of the display switching means makes it possible to set, of the front side display and the back side display, a display for displaying an image with the operation of the operation interface. In addition, a function is also disclosed in which the controller automatically turns on the display of the front side display when the self-timer mode is set.

SUMMARY

The present disclosure provides an imaging apparatus that can facilitate shooting an image of a shooting subject person in the imaging apparatus provided with a plurality of displays.

In one aspect of the present disclosure, an imaging apparatus, for capturing an image of a subject, includes: a first display; a second display including a display screen configured to change an orientation toward a subject side; a controller configured to control operations of the first and second displays; and a proximity detector configured to detect an object in proximity to the first display, wherein when a predetermined condition is satisfied, the controller causes the first display to display an image of the subject, and causes the second display to display an image showing the subject simultaneously with the first display, and wherein when the orientation of the display screen is toward the subject side, the controller causes the second display to display the image showing the subject, and shooting information on image shooting of the subject, in a case where the object is not detected by the proximity detector, and causes the second display to display the image showing the subject simultaneously with the first display, without displaying a part or a whole of the shooting information on the second display, in a case where the object is detected by the proximity detector.

In another aspect of the disclosure, an imaging apparatus, for capturing an image of a subject, includes: a first display; a second display including a display screen configured to change an orientation toward a subject side; and a controller configured to control operations of the first and second displays, wherein when a predetermined condition is satisfied, the controller causes the first display to display an image of the subject, and causes the second display to display an image showing the subject simultaneously with the first display, and during shooting a moving image of the subject when the predetermined condition is satisfied with the orientation of the display screen being toward the subject side, the controller causes the second display to display information indicating that the moving image is under shooting, instead of the image showing the subject simultaneously with the first display.

In further another aspect of the disclosure, an imaging apparatus, for capturing an image of a subject, the imaging apparatus, includes: a first display; a second display including a display screen configured to change an orientation toward a subject side; a controller configured to control operations of the first and second displays; and an operation interface configured to input a user operation on the display screen, wherein when a predetermined condition is satisfied, the controller causes the first display to display an image of the subject causes the second display to display an image showing the subject simultaneously with the first display, and sets to disable the user operation on the display screen in the operation interface.

According to the present disclosure, it is possible to provide an imaging apparatus capable of facilitating shooting an image of a shooting subject person in an imaging apparatus including a plurality of displays.

DETAILED DESCRIPTION

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art. It should be noted that the inventor provides the accompanying drawings and the following description for a person skilled in the art to fully understand the present disclosure. Thus, the drawings and the description are not intended to limit the subject matter defined in the claims.

First Embodiment

In the first embodiment, a digital camera as an example of an imaging apparatus according to the present disclosure will be described.

1. Configuration

A configuration of a digital camera according to the first embodiment will be described with reference to FIGS. 1 to 3.

Figure 1:
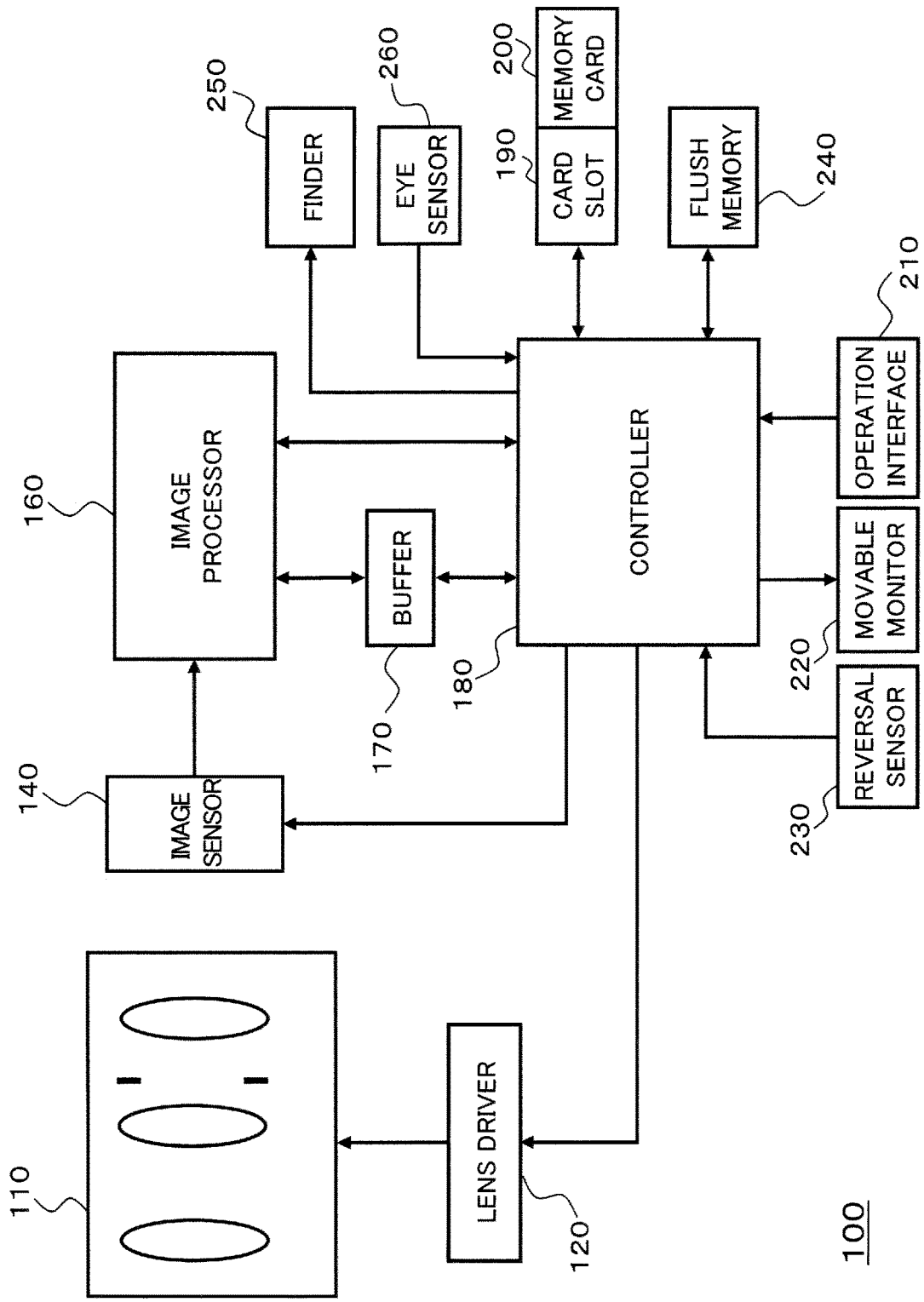
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an optical system 110, a lens driver 120, and an image sensor 140. Furthermore, the digital camera 100 includes an image processor 160, a buffer memory 170, a controller 180, an operation interface 210, a movable monitor 220, and a reversal sensor 230. Furthermore, the digital camera 100 includes a flash memory 240, a card slot 190, a finder 250, and an eye sensor 260.

The optical system 110 includes a zoom lens, a focus lens, and the like. The zoom lens is a lens for changing the magnification of the subject image formed by the optical system. The focus lens is a lens for changing the focus state of the subject image formed on the image sensor 140. The zoom lens and the focus lens are formed of one or more lenses.

The lens driver 120 includes a configuration for driving various lenses of the optical system 110 such as a focus lens. For example, the lens driver 120 includes a motor, to move the focus lens along the optical axis of the optical system 110 based on the control of the controller 180. The configuration for driving the focus lens in the lens driver 120 can be implemented with a DC motor, a stepping motor, a servo motor, an ultrasonic motor, or the like.

The image sensor 140 captures a subject image incident via the optical system 110 and generates an image signal. The image signal includes information on the light quantity exposed for each pixel by the image sensor 140, and indicates an image of the imaging result. The generated image signal is digitized via, for example, an AD converter (not shown) and input into the image processor 160.

The image sensor 140 generates image data on a new frame at a predetermined frame rate (e.g., 30 frames/second). The imaging data generation timing and electronic shutter operation in the image sensor 140 are controlled by the controller 180. As the image sensor 140, various image sensors such as a CMOS image sensor, a CCD image sensor, or an NMOS image sensor can be used.

The image sensor 140 performs an imaging operation of a still image, an imaging operation of a through image, and the like. The through image is mainly a moving image, and is displayed on the movable monitor 220 in order for the user to determine composition for capturing a still image. The image sensor 140 is an example of an image sensor in the present embodiment.

The image processor 160 performs predetermined processing on the image signal output from the image sensor 140 to generate image data, or performs various processing on the image data to generate an image for being displayed on the movable monitor 220. The predetermined processing includes white balance correction, gamma correction, YC conversion processing, electronic zoom processing, compression processing, expansion processing, and the like, but is not limited to these. The image processor 160 may be configured with a hard-wired electronic circuit, or may be configured with a microcomputer, a processor, or the like using a program.

The buffer memory 170 is a recording medium that functions as a work memory for the image processor 160 and the controller 180. The buffer memory 170 is implemented with a dynamic random-access memory (DRAM) or the like. The flash memory 240 is a non-volatile recording medium. Each of the memories 170 and 240 is an example of a memory in the present embodiment.

The controller 180 controls the overall operation of the digital camera 100. The controller 180 uses the buffer memory 170 as a work memory during a control operation or an image processing operation.

The controller 180 includes a CPU or an MPU, and the CPU or MPU achieves a predetermined function by executing a program (software). The controller 180 may include a processor including a dedicated electronic circuit designed to achieve a predetermined function instead of the CPU or the like. That is, the controller 180 can be implemented with various processors such as a CPU, an MPU, a GPU, a DSP, an FPGA, and an ASIC. The controller 180 may include one or more processors.

The card slot 190 can mount the memory card 200, and accesses the memory card 200 based on the control from the controller 180. The digital camera 100 can record image data on the memory card 200 and read the recorded image data from the memory card 200.

The operation interface 210 is a generic term for operation members that receive an operation (instruction) from a user. The operation interface 210 includes a button, a lever, a dial, a touch panel, a switch, and the like that receive operations from the user. In addition, the operation interface 210 may also include virtual buttons and icons displayed on the movable monitor 220 or the finder 250.

The movable monitor 220 is an example of a display that has a display screen for displaying various information and can change the orientation of the display screen. For example, the movable monitor 220 displays an image (through image) indicated by image data which is captured by the image sensor 140 and on which image processing is performed by the image processor 160. In addition, the movable monitor 220 displays a menu screen or the like for the user to make various settings for the digital camera 100. The movable monitor 220 can be configured by a liquid crystal display device or an organic EL device, for example.

Figure 2:
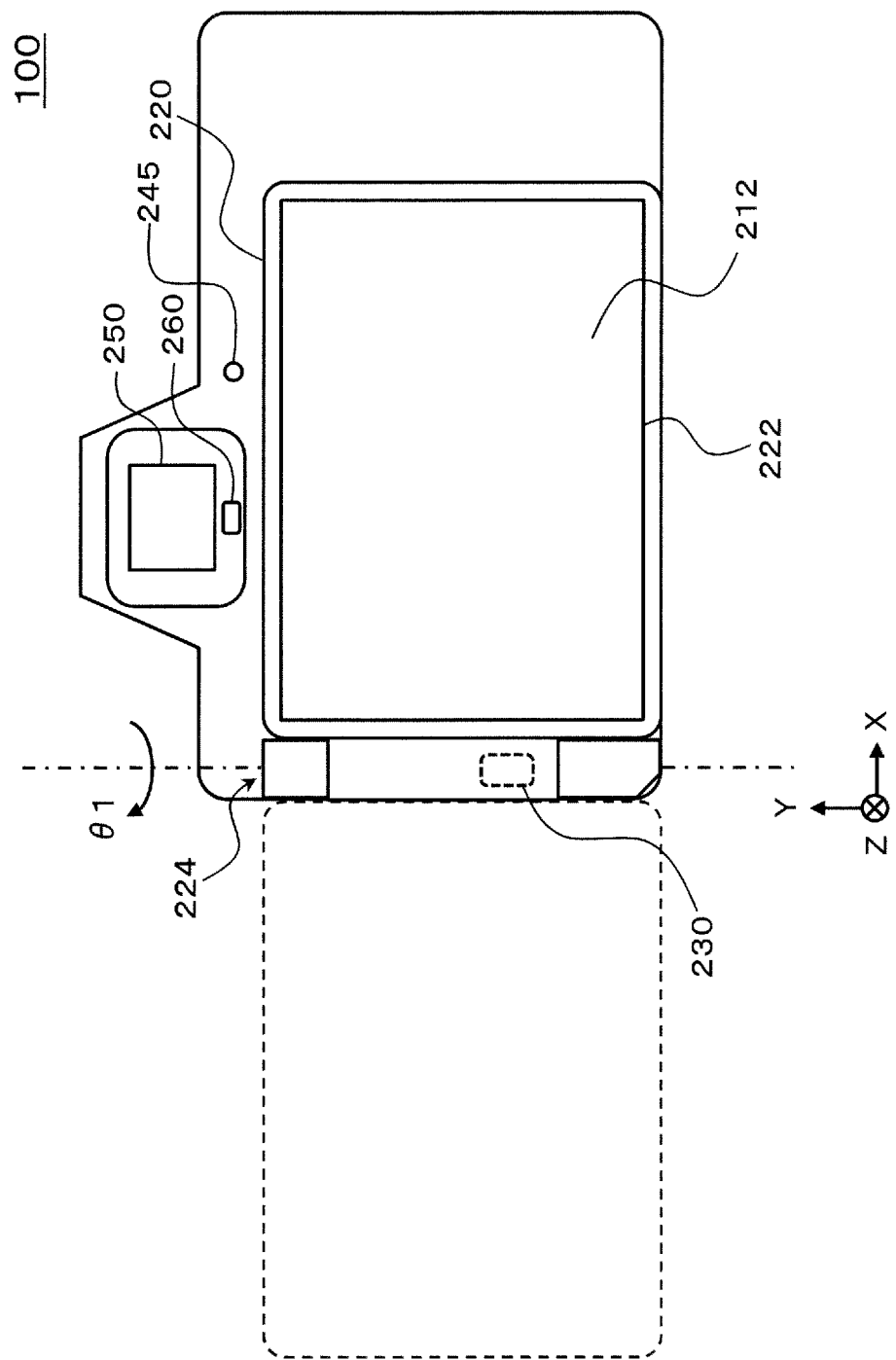
FIG. 2 is a diagram illustrating a back surface of the digital camera.

FIG. 2 illustrates a back surface of the digital camera 100. For example, a touch panel 212 included in the operation interface 210 is provided to be superposed on the display screen 222 of the movable monitor 220. Hereinafter, the horizontal direction and the vertical direction of the digital camera 100 and the optical axis direction of the optical system 110 are referred to as X, Y, and Z directions, respectively.

Figure 3:
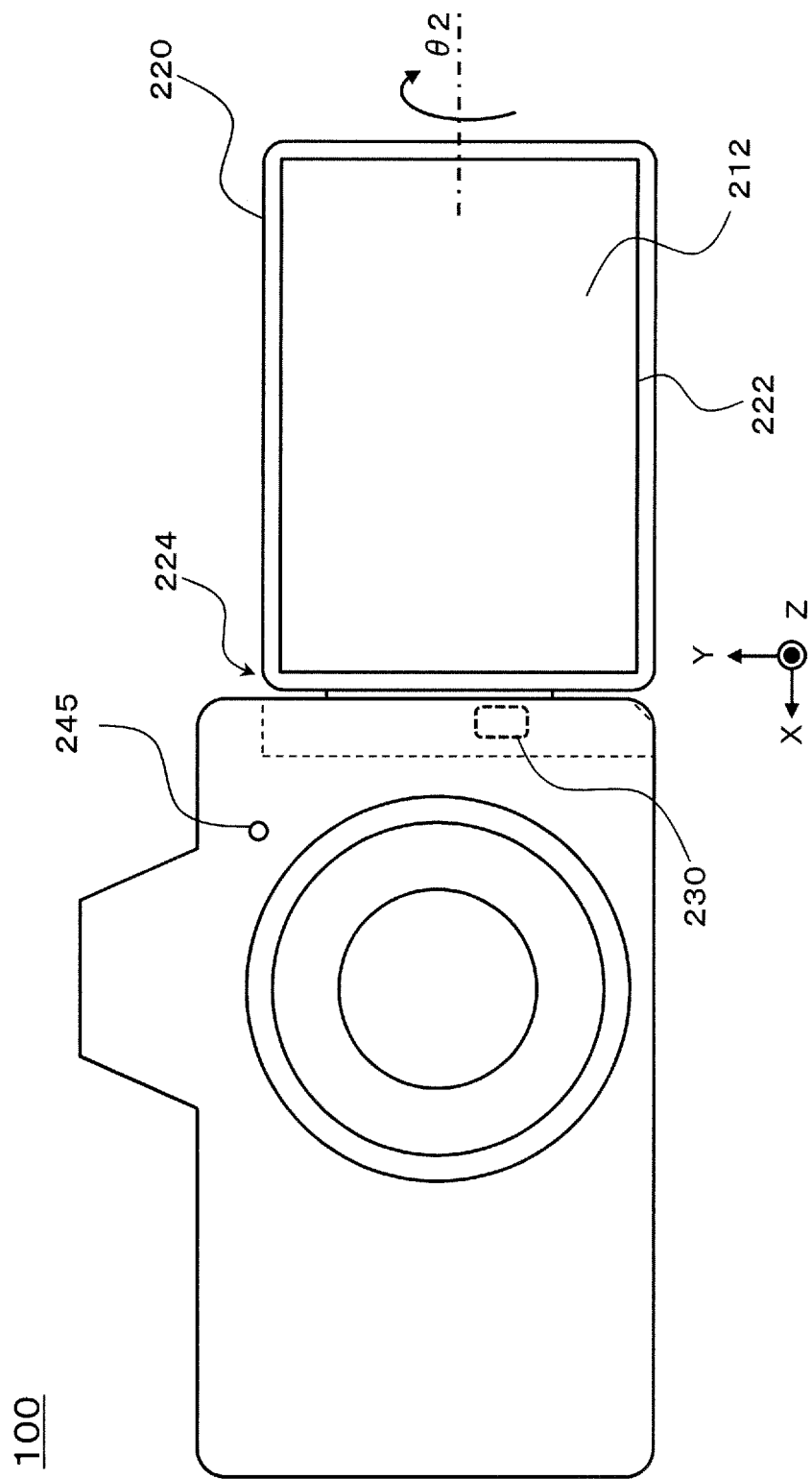
FIG. 3 is a diagram illustrating a state in which a movable monitor of the digital camera is reversed.

FIG. 3 illustrates a state in which the movable monitor 220 of the digital camera 100 is reversed. As a mechanism of the movable monitor 220, for example, a vari-angle method can be adopted. As illustrated in FIGS. 2 and 3, the movable monitor 220 includes a movable mechanism 224 that can rotate on two axes so as to change the orientation of the display screen 222.

The movable mechanism 224 includes a hinge that can rotate with the Y direction as the rotation axis so as to open and close the portion including the display screen 222 of the movable monitor 220 from the main body of the digital camera 100. FIG. 2 illustrates a state in which the movable monitor 220 of the digital camera 100 is closed at an opening and closing angle θ1=0°. FIG. 3 illustrates a state in which the movable monitor 220 is opened at an opening and closing angle θ1=180°.

Furthermore, the movable mechanism 224 is configured so that the movable monitor 220 can rotate with the horizontal direction (X direction in FIG. 3) of the digital camera 100 as a rotation axis. In the state in FIG. 3, the rotation angle is θ2=0°, and the display screen 222 of the movable monitor 220 faces the subject side (+Z side), that is, the movable monitor 220 is reversed. Rotating the movable monitor 220 to a rotation angle θ2=180°, for example, from the state shown in FIG. 3 causes the display screen 222 to face the back side (−Z side). Even with adjusting the rotation angle θ2 in this way, it is possible to return the reversal of the movable monitor 220.

The reversal sensor 230 is, for example, a device provided inside the movable mechanism 224 for detecting whether or not the orientation of the movable monitor 220 is reversed, to generate a detection signal. The reversal sensor 230 is an example of the orientation detector in the present embodiment.

For example, the reversal sensor 230 includes a switch that turns on/off depending on whether or not the opening and closing angle θ1 exceeds a predetermined threshold value, and a switch that turns on/off depending on whether or not the rotation angle θ2 exceeds a predetermined threshold value. For example, the threshold value of the opening and closing angle θ1 is 170°, and the threshold value of the rotation angle θ2 is 10°. The detection signal of the reversal sensor 230 indicates on/off of each of the above switches.

The digital camera 100 may be provided with a tally lamp 245 as illustrated in FIGS. 2 and 3. The tally lamp 245 is configured by, for example, an LED or the like, to light up at the time when shooting a moving image.

The finder 250 is, for example, an electronic viewfinder, and is an example of a display that displays various information. The finder 250 is arranged at the upper portion of the back surface of the digital camera 100, for example as shown in FIG. 2. The finder 250 includes a display device such as a liquid crystal display or an organic EL display inside. The finder 250 further includes a window formed of a transparent member.

The eye sensor 260 is a sensor that detects the proximity of an object. The eye sensor 260 is provided near the window of the finder 250. When the eye sensor 260 detects the existence of an object close in a predetermined distance range, the eye sensor 260 outputs a detection signal indicating the detection result. The distance range is set to detect the proximity of the user's face such as bringing the eyes close to the window of the finder 250. The eye sensor 260 is an example of a proximity detector in the present embodiment.

2. Operation

The operation of the digital camera 100 configured as described above will be described in the following.

2-1. Outline of Operation

An outline of an operation of displaying various information such as a live view display to a user such as a photographer in the digital camera 100 of the present embodiment will be described with reference to FIGS. 4 and 5.

Figure 4:
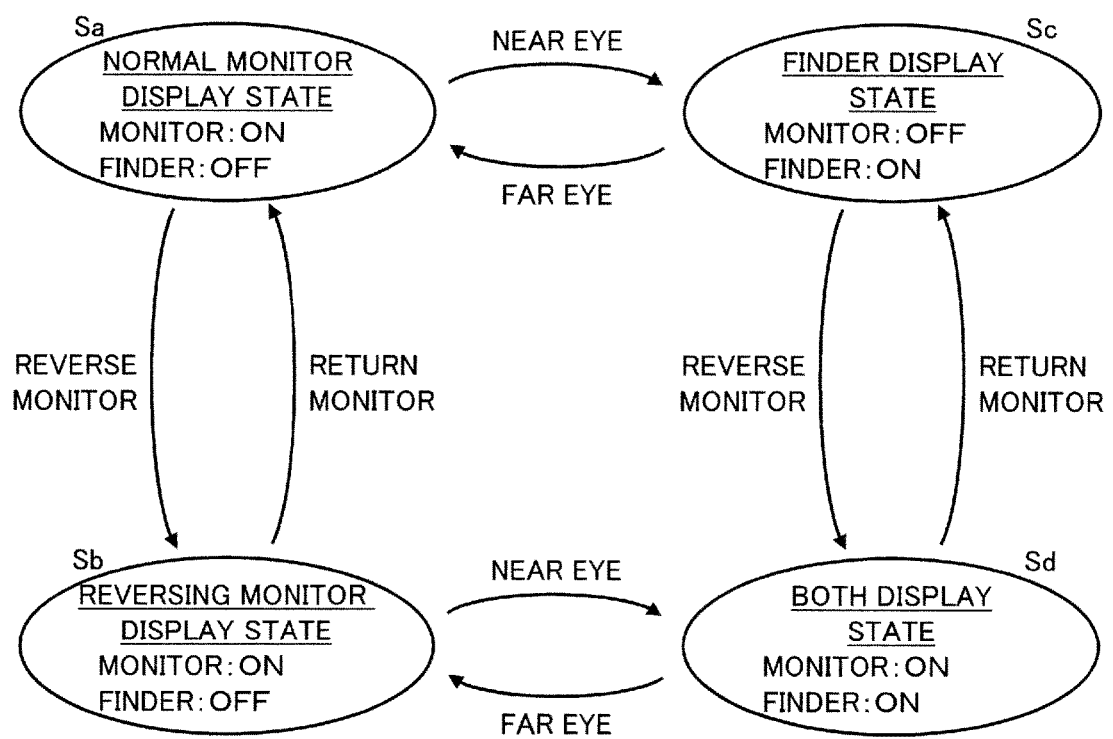
FIG. 4 is a state transition diagram for illustrating a display operation in the digital camera.

FIG. 4 is a state transition diagram for illustrating the display operation in the digital camera 100. FIG. 5 shows an example of a shooting situation using the digital camera 100.

As exemplified in FIG. 4, the digital camera 100 of the present embodiment has a normal monitor display state Sa, a reversing monitor display state Sb, a finder display state Sc, and both display state Sd. Each of the display states Sa to Sd is an operation state in which the digital camera 100 transitions between each other in the operation of performing the live view display or the like on image shooting and shooting standby.

The normal monitor display state Sa is a state for a user such as a photographer to view the display screen 222 of the movable monitor 220 on the back side of the digital camera 100 without looking into the finder 250 in particular. In the normal monitor display state Sa, the finder 250 is turned off so as not to perform the display operation, while the movable monitor 220 is turned on. In this case, information desired by the user such as a through image for live view display can be displayed on the display screen 222 of the movable monitor 220.

The reversing monitor display state Sb is a state for the user to use the movable monitor 220 on the front side, that is, the subject side of the digital camera 100, when taking a selfie for example. In the reversing monitor display state Sb, the movable monitor 220 is reversed so that the display screen 222 faces the subject side. In the reversing monitor display state Sb, the finder 250 is turned off and the movable monitor 220 is turned on, as in the normal monitor display state Sa.

The finder display state Sc is a state in which the user such as the photographer looks into the finder 250 and does not use the movable monitor 220. In this case, as in the normal monitor display state Sa, the movable monitor 220 is not particularly reversed. In the finder display state Sc, the finder 250 is turned on and the movable monitor 220 is turned off.

In the above three display states Sa to Sc, selectively turning on one of the finder 250 and the movable monitor 220, which is used by the user such as the photographer. This allows the power consumption of the digital camera 100 to be reduced, and resulting in extending the shooting duration, for example.

In the digital camera 100 of the present embodiment, in addition to the above three display states Sa to Sc, the both display state Sd that turns on both the finder 250 and the movable monitor 220 is provided. The both display state Sd is used to present information not only to the photographer of the digital camera 100, but also to a user on the subject side. The shooting situation in which the both display state Sd is used will be described with reference to FIG. 5.

Figure 5:
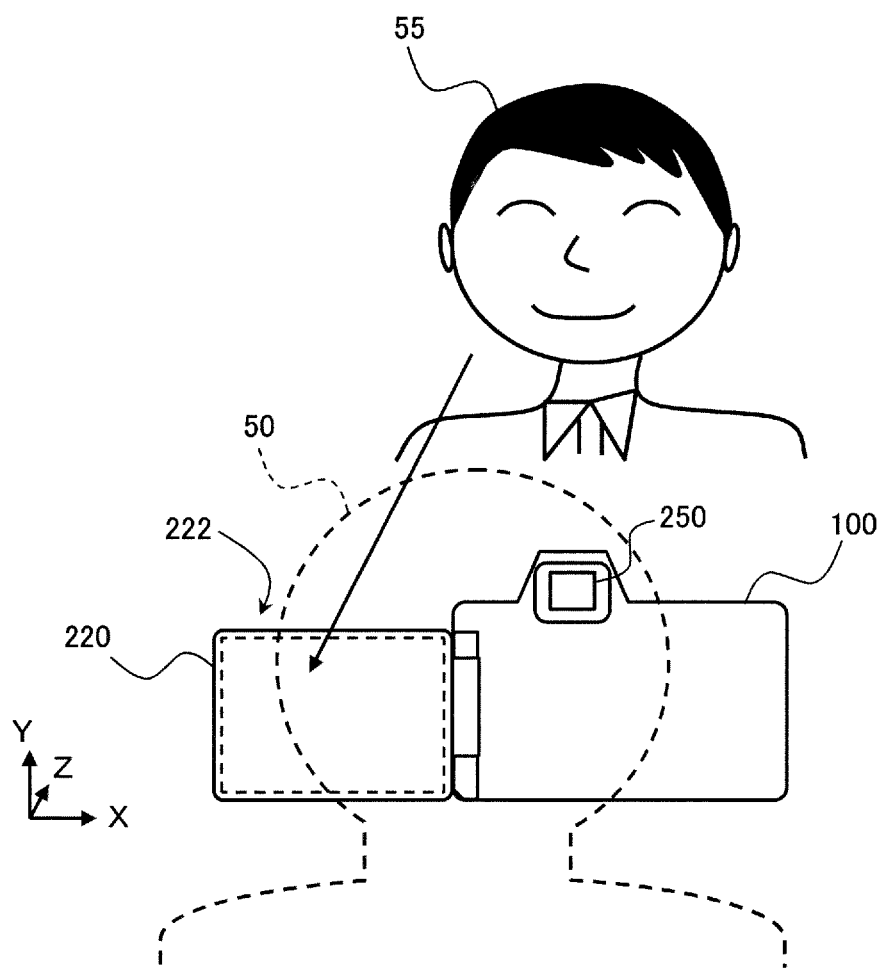
FIG. 5 is a diagram showing an example of a shooting situation using the digital camera.

FIG. 5 illustrates a state in which the photographer 50 shoots a moving image or the like of a person being a subject, that is, a shooting subject person 55, using the digital camera 100 of the present embodiment. In this example, the photographer 50 looks into the finder 250. In addition, the movable monitor 220 of the digital camera 100 is reversed so that the display screen 222 faces the shooting subject person 55.

In the situation illustrated in FIG. 5, a demand is expected that the photographer 50 wants to check the composition and operation information in shooting and also the shooting subject person 55 wants to check how own image is to be shot now. However, conventional digital cameras are difficult for both the photographer 50 and the shooting subject person 55 to check desired information simultaneously, such that the live view display on the movable monitor cannot be performed when the photographer 50 is using the finder, for example.

To this end, in the present embodiment, the digital cameras 100 is transferred to the both display state Sd in the situation illustrated in FIG. 5, to cause the finder 250 and the movable monitor 220 to simultaneously perform live view display and the like. As a predetermined condition for automatically shifting to the both display state Sd, the digital camera 100 of the present embodiment uses the reversal of the movable monitor 220 and the detection of the proximity of eyes to the finder 250 as a trigger. Hereinafter, details of the operation of the digital camera 100 according to the present embodiment will be described.

2-2. Details of Operation

The display operation of the digital camera 100 of the present embodiment will be described with reference to FIGS. 6 to 10.

Figure 6:
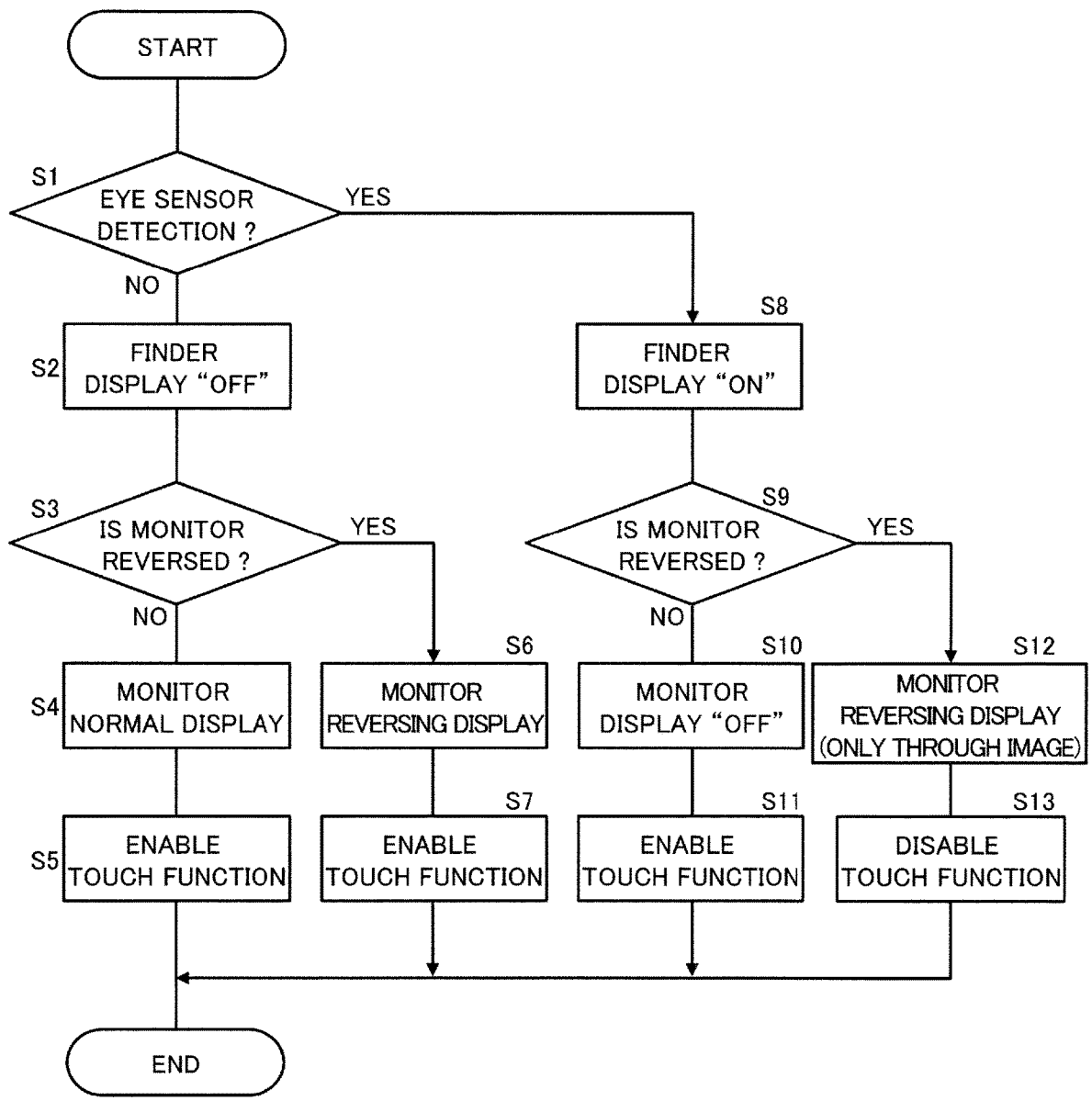
FIG. 6 is a flowchart illustrating the processing of the display operation of the digital camera in the first embodiment.

FIG. 6 is a flowchart illustrating the processing of the display operation of the digital camera 100 in the present embodiment. FIGS. 7 to 10 show display examples of the normal monitor display state Sa, the reversing monitor display state Sb, the finder display state Sc, and the both display state Sd of the digital camera 100, respectively.

Each processing shown in the flowchart in FIG. 6 is executed at a predetermined cycle by the controller 180 of the digital camera 100, for example, in the live view mode.

The controller 180 determines whether or not the proximity of the object (i.e., the proximity of eyes) is detected, based on the detection signal by the eye sensor 260 (S1). For example, when the photographer 50 looks into the finder 250, the eyes or the like of the photographer 50 approach the eye sensor 260. At this time, the eye sensor 260 outputs a detection signal to indicate that an object in proximity is detected, and the controller 180 proceeds to YES in step S1.

When determining that the proximity of the object is not detected by the eye sensor 260 (NO in S1), the controller 180 stops the power supply for operating the finder 250, to control the finder 250 in the off state, for example (S2). At this time, the finder 250 is turned off, and does not perform any display operation in particular, for example.

Furthermore, the controller 180 determines whether or not the movable monitor 220 is reversed so that the display screen 222 faces the subject side, based on the detection signal by the reversal sensor 230 (S3). For example, when the opening and closing angle θ1 of the movable monitor 220 (see FIG. 2) exceeds the threshold value and the rotation angle θ2 (see FIG. 3) does not exceed the threshold value, the determination in step S3 is YES, and otherwise, the determination in step S3 is NO.

When determining that the movable monitor 220 is not reversed (NO in S3), the controller 180 controls the movable monitor 220 to perform the display operation in the normal monitor display state Sa (S4). A display example in step S4 is shown in FIG. 7.

Figure 7:
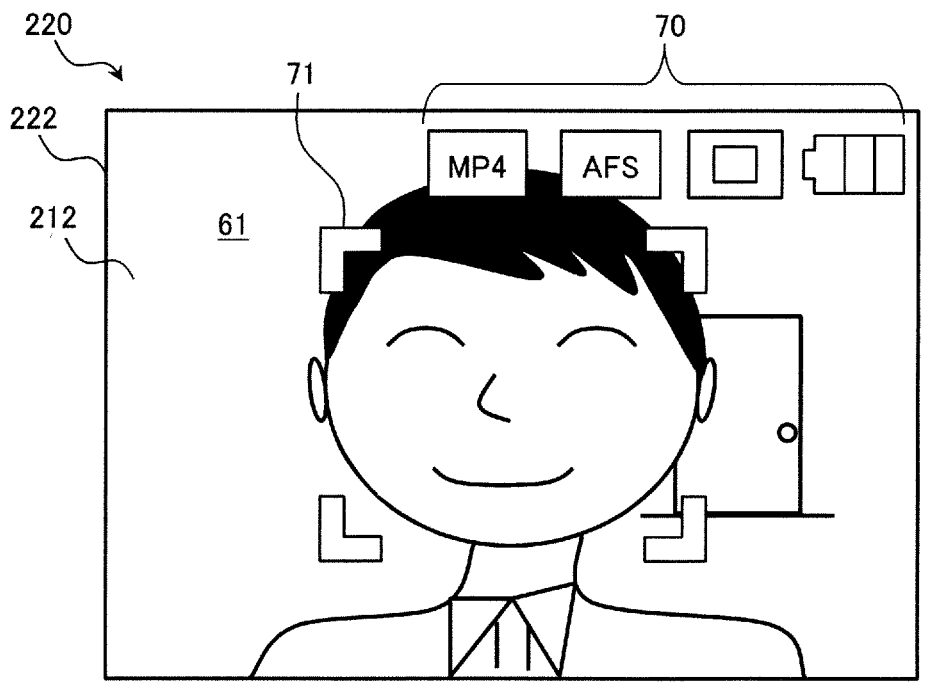
FIG. 7 is a diagram showing a display example in a normal monitor display state of the digital camera.

FIG. 7 shows a display example in the case where the photographer 50 does not look into the finder 250 of the digital camera 100 and does not reverse the movable monitor 220 (NO in S1 and S3), in the same external environment (shooting scene) as in FIG. 5. Under the control in step S4, the movable monitor 220 in the normal monitor display state Sa displays, on the display screen 222, a through image 61 and various icons 70 and indicators 71, as exemplified in FIG. 7.

Shooting information such as the icons 70 can be set to information related to various states and operations in the digital camera 100. For example, the shooting information may include an autofocus (AF) frame, a manual focus (MF) assist, a moving image recording mode, a microphone level information, and the like.

In step S4 in FIG. 6, based on the image signal showing the real-time capturing result by the image sensor 140, the controller 180 causes the image processor 160 to generate image data indicating a screen in which the icons 70 or the like are superimposed on the through image 61, as exemplified in FIG. 7. The image processor 160 sequentially outputs the generated image data to the movable monitor 220.

Furthermore, the controller 180 sets to enable the touch function that is the operation function of the touch panel 212 (S5), in order to receive the touch operation on each part of the screen displayed on the display screen 222 in the normal monitor display state Sa (S4).

When it is determined that the eye sensor 260 does not detect the proximity of an object (NO in S1) and the movable monitor 220 is reversed (YES in S3), the controller 180 controls the movable monitor 220 to perform display operation in the reversing monitor display state Sb (S6). A display example in step S6 is shown in FIG. 8.

Figure 8:
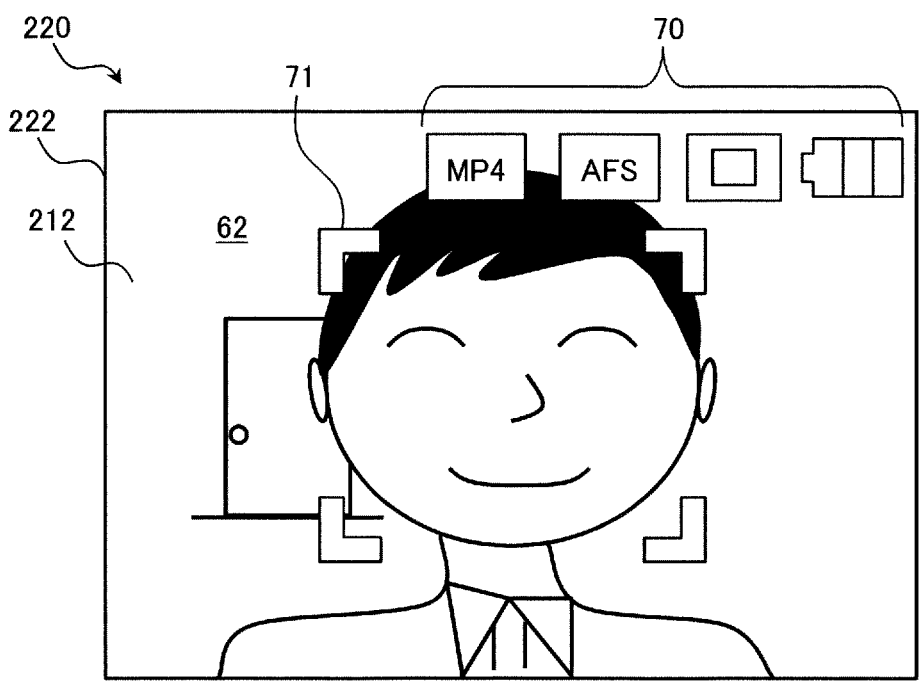
FIG. 8 is a diagram showing a display example in a reversing monitor display state of the digital camera.

FIG. 8 shows a display example in the case where the movable monitor 220 is reversed (YES in S3) in the same shooting scene as in FIG. 7. In the reversing monitor display state Sb (S6), the movable monitor 220 displays a through image 62 reversed from the through image 61 (see FIG. 7) in the normal monitor display state Sa, the icons 70, and the like on the display screen 222. The position and orientation for displaying the icons 70 and the like may be the same as in FIG. 7, or may be different.

In step S6, the controller 180 causes the image processor 160 to generate image data so as to include the reversed through image 62, in the same processing as in step S4. In addition, the controller 180 sets the touch function enabled to receive a touch operation according to the display position on the display screen 222 in the reversing monitor display state Sb (S6) as illustrated in FIG. 8 (S7).

On the other hand, when the eye sensor 260 detects the proximity of an object (YES in S1), the controller 180 supplies operating power to the finder 250, to control the finder 250 into the on state, for example (S8). Step S8 is processing for executing the display operation of the finder 250 in the finder display state Sc or the both display state Sd. A display example in step S8 is shown in FIG. 9.

Figure 9:
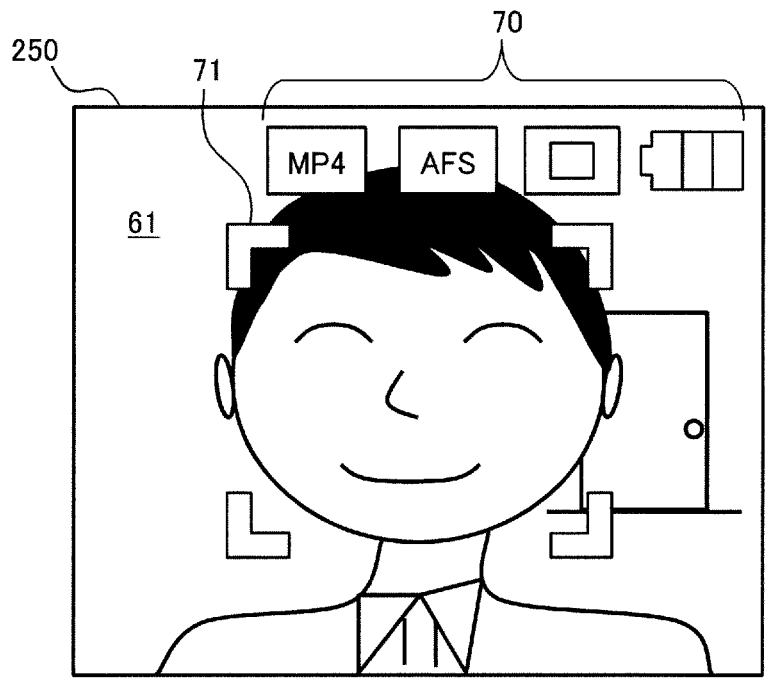
FIG. 9 is a diagram showing a display example in a finder display state of the digital camera.

FIG. 9 shows a display example in the case where the photographer 50 looks into the finder 250 (YES in S1) in the same shooting scene as in FIG. 7. Under the control in step S8, the finder 250 displays the through image 61, various icons 70, and the like, in the same manner as the display screen 222 (FIG. 7) in the normal monitor display state Sa, for example. At this time, in addition to the image data for display of the movable monitor 220, the controller 180 causes the image processor 160 to generate image data in line with the aspect ratio or the like of the finder 250, and to output the image data to the finder 250 (S8).

In the digital camera 100 of the present embodiment, also when the display operation of the finder 250 is performed as described above (S8), the controller 180 determines whether or not the movable monitor 220 is reversed, based on the detection signal of each of the sensors 230 and 260 (S9). The determination in step S9 is performed in the same manner as in step S3, for example.

When determining that the movable monitor 220 is not reversed (NO in S9), the controller 180 controls the movable monitor 220 into the off state, such as turning off the display screen 222 (S10). According to step S10, the digital camera 100 is in the finder display state Sc, and the movable monitor 220 does not perform the display operation.

At this time, the display screen 222 of the movable monitor 220 faces the photographer 50 side without displaying anything in particular. Thus, for example, the touch panel 212 may be used like a touch pad for the screen displayed on the finder 250 for the touch operation of touching the display screen 222. In this case, the controller 180 sets the touch function enabled to receive the touch operation according to the display position on the screen of the finder 250 (S11).

On the other hand, when determining that the movable monitor 220 is reversed (YES in S9), the controller 180 controls the movable monitor 220 so that the movable monitor 220 performs a display operation together with the finder 250 in the both display state Sd (S12). A display example in step S12 is shown in FIG. 10.

Figure 10:
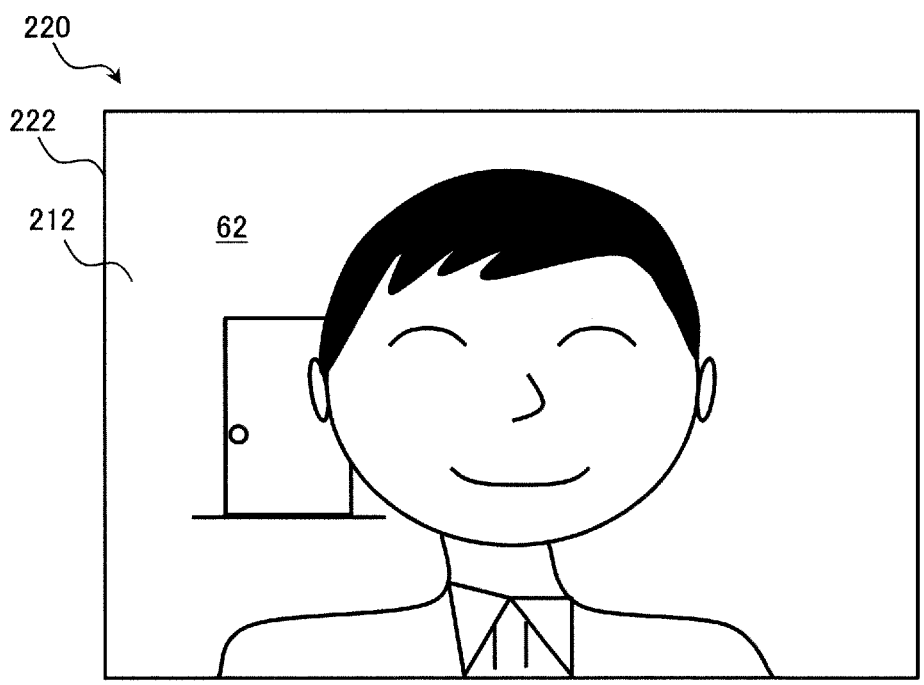
FIG. 10 is a diagram showing a display example in a both display state of the digital camera.

FIG. 10 shows a display example of the display screen 222 of the movable monitor 220 in the shooting situation in FIG. 5 (YES in S1 and S9). When the movable monitor 220 displays the screen illustrated in FIG. 10, the finder 250 displays the screen illustrated in FIG. 9 (S8).

In the both display state Sd of the present embodiment, the icons 70 and the like are displayed on the finder 250 (FIG. 9), but the movable monitor 220 only displays the through image 62 without displaying the icons 70 and the like as illustrated in FIG. 10, under the control in step S12. In the both display state Sd, the through image 62 on the movable monitor 220 is reversed from the through image 61 on the finder 250 in the same manner as in the reversing monitor display state Sb (see FIG. 8). In step S12, the controller 180 causes the image processor 160 to generate image data indicating a screen that does not include the icons 70 and the like in the same processing as in step S6.

Furthermore, the controller 180 sets to disable the touch function on the display screen 222 of the movable monitor 220 in the both display state (S12) so that the touch panel 212 is not operable to receive the touch operation (S13).

The controller 180 ends the processing shown in the present flowchart by setting the corresponding touch functions and the like (S5, S7, S11, and S13) in various display states Sa to Sd, for example. The controller 180 repeats the processing of the present flowchart at a predetermined cycle.

According to the above processing, on the trigger condition that the proximity of eyes of the photographer 50 to the finder 250 is detected and the movable monitor 220 is reversed (YES in S1 and S9), the digital camera 100 of the present embodiment shifts to the both display state Sd (S8, S12).

In the present embodiment, the both display state Sd is to be used in the case that the screen of the finder 250 (FIG. 9) is viewed by the photographer 50, and the screen of the movable monitor 220 (FIG. 10) is viewed by the shooting subject person 55. Thus, in the present embodiment, displaying a screen in which the display of the icons 70 or the like is intentionally omitted on the display screen 222 of the movable monitor 220 makes it possible to easily look at the through image 62 which the shooting subject person 55 desires to check, as illustrated in FIG. 10. In addition, for the photographer 50, displaying various information such as icons 70 on the finder 250 makes it possible to simultaneously present the information which both persons desire to check.

Furthermore, in the both display state Sd as described above, the touch operation on the display screen 222 of the movable monitor 220 is set to be disabled (S13). Thus, a situation can be suppressed where erroneous operation unintended by the photographer 50 occurs in the digital camera 100, such as when the photographer 50 looks into the finder 250, the shooting subject person 55 touches the display screen 222, for example.

When the photographer 50 takes his eyes off the finder 250 in the both display state Sd, the digital camera 100 shifts to the reversing monitor display state Sb (NO in S1, YES in S3), as shown in FIG. 4. At this time, as illustrated in FIG. 8, the icons 70 and the like are displayed on the display screen 222 of the movable monitor 220, and the touch function is also enabled (S6, S7). This makes it easier to shoot an image with the digital camera 100T, as the photographer 50, upon taking a selfie, can input a touch operation as well as checking the display screen 222.

When the photographer 50 returns the orientation of the reversed movable monitor 220 from the both display state Sd in FIG. 4 for example, the digital camera 100 shifts to the finder display state Sc (YES in S1, NO in S9). Furthermore, when the photographer 50 takes his eyes off the finder 250, the digital camera 100 shifts to the normal monitor display state Sa (NO in S1 and S3).

As described above, transitioning between each display state Sa to Sd according to the change in the shooting situation makes it possible to display useful information in each shooting situation and to facilitate shooting using the digital camera 100. The user can easily reach the both display state Sd by performing a simple procedure, in which the photographer 50 checks the display screen 222 upon taking the eyes off, adjusts the orientation of the movable monitor 220 so as to be in the reversing monitor display state Sb, and then brings the eyes closer, for example.

In step S11 above, an example of setting to enable the touch function of the touch panel 212 in the finder display state Sc is described. In step S11, the touch function may be set to be disabled.

In step S12 described above, an example is described in which only the through image 62 is displayed and no icons 70 and the like are displayed, on the display screen 222 of the movable monitor 220. In step S12, a part of the shooting information such as the icons 70 may not be displayed, or the icons and the like necessary for the shooting subject person 55 may be displayed on the display screen 222 of the movable monitor 220. For example, information that do not obstruct when the through image 62 is to be checked or information that the shooting subject person 55 is also expected to desire to check may be displayed on the display screen 222.

The display operation in FIG. 6 described above is performed during shooting standby or during shooting, for example, in the live view mode of the digital camera 100. The digital camera 100 may be restricted not to shift to the both display state Sd at the time of playback display or setting menu display.

3. Effects and the Like

As described above, the digital camera 100 of the present embodiment is an example of an imaging apparatus that captures an image of a subject. The digital camera 100 includes a finder 250 being an example of a first display, a movable monitor 220 being an example of a second display, and a controller 180. The movable monitor 220 includes a display screen 222 whose orientation can be changed toward the subject. The controller 180 controls the operation of the finder 250 and the movable monitor 220. When a predetermined condition is satisfied (YES in S1 and S9), the controller 180 causes the finder 250 to display a through image 61 being an example of the subject image (S8), and causes the movable monitor 220 to display a through image 62 being an example of an image showing the subject simultaneously with the finder 250 (S12).

According to the above digital camera 100, when a predetermined condition is satisfied which is expected to be the situation in which the photographer 50 and the shooting subject person 55 each desire to check desired information, the through images 61 and 62 can be displayed simultaneously on the finder 250 and the movable monitor 220. This makes it possible to facilitate shooting the image of the shooting subject person 55 using the digital camera 100.

The digital camera 100 of the present embodiment further includes a reversal sensor 230 being an example of an orientation detector that detects whether or not the orientation of the display screen 222 is toward the subject side. The predetermined condition described above includes that the orientation of the display screen 222 is detected to be toward the subject side. Thus, when the display screen 222 of the movable monitor 220 is directed toward the shooting subject person 55, it is possible to shift to the both display state Sd and to more easily take a picture of the shooting subject person 55.

The digital camera 100 of the present embodiment further includes an eye sensor 260 being an example of a proximity detector that detects an object in proximity to the finder 250. The predetermined condition described above is that the orientation of the display screen 222 is detected to be toward the subject side, and the object is detected by the eye sensor 260. Thus, when the photographer 50 looks into the finder 250, it is possible to shift to the both display state Sd and to display information useful for both the photographer 50 and the shooting subject person 55.

In the present embodiment, when an object is not detected by the eye sensor 260 (NO in S1), the controller 180 switches whether or not to reverse the image displayed on the movable monitor 220 according to the detection result of the reversal sensor 230 (S3, S4, and S6). When an object is detected by the eye sensor 260 (YES in S1), the controller 180 switches whether or not to cause the movable monitor 220 to display an image showing the subject simultaneously with the finder 250 according to the detection result by the reversal sensor 230 (S9, S10, and S12). Thus, it is possible to switch the four display states Sa to Sd (FIG. 4) according to the shooting situation, and to display useful information on the movable monitor 220 and/or the finder 250 on a timely basis.

In the present embodiment, when the orientation of the display screen 222 is toward the subject side (YES in S3 or S9), and when no object is detected by the eye sensor 260 (NO in S1), the controller 180 causes the movable monitor 220 to display a through image 62 showing the subject and icons 70 and the like being an example of shooting information indicating various information on the image shooting the subject (see S6 and FIG. 8). On the other hand, when an object is detected by the eye sensor 260 (YES in S1), the controller 180 causes the movable monitor 220 to display a through image 62 showing the subject simultaneously with the finder 250, without causing the movable monitor 220 to display part or the whole of the above shooting information (see S12 and FIG. 10). Thus, it is possible to easily perform shooting using the digital camera 100 by displaying the desired information to each of the photographer 50 taking a selfie and the shooting subject person 55.

In the present embodiment, when the predetermined condition is satisfied (YES in S1 and S9), the controller 180 causes the finder 250 to display the through image 61 of the subject and the shooting information concerning the shooting of the subject (see S8 and FIG. 9). At this time, the controller 180 causes the movable monitor 220 to display a through image 62 showing the subject simultaneously with the finder 250, without causing the movable monitor 220 to display part or the whole of the shooting information (see S12 and FIG. 10). Thus, it is possible to easily perform shooting using the digital camera 100 by displaying the desired information to each of the photographer 50 and the shooting subject person 55.

The digital camera 100 of the present embodiment further includes a touch panel 212 being an example of an operation interface for inputting a user operation on the display screen 222. When the predetermined condition is satisfied (YES in S1 and S9), the controller 180 sets to disable the user operation onto the display screen 222 in the touch panel 212 (S13). Thus, it is possible to easily perform shooting using the digital camera 100 by, for example, avoiding erroneous operation of the touch panel 212 by the shooting subject person 55.

In the present embodiment, the first display is an electronic viewfinder, and the second display is a movable monitor. In the imaging apparatus including such a plurality of displays, it is possible to facilitate taking a picture of the shooting subject person.

Second Embodiment

In the second embodiment, a digital camera 100 that prohibits the display of the movable monitor 220 to the shooting subject person 55 during the shooting of a moving image will be described.

Hereinafter, description of the same configuration and operation as those of the digital camera 100 according to the first embodiment will be appropriately omitted, and the digital camera 100 according to the present embodiment will be described.

Figure 11:
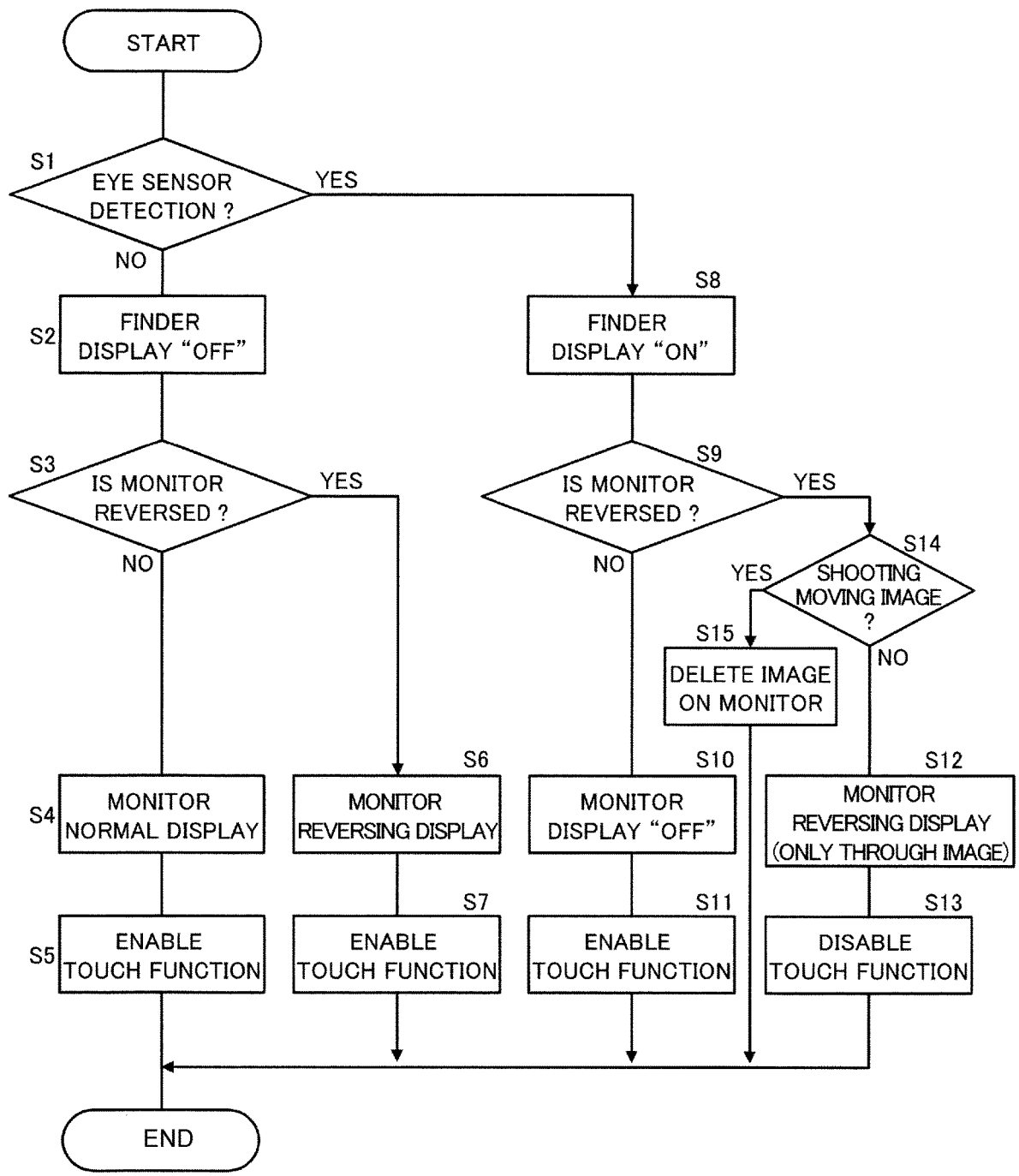
FIG. 11 is a flowchart illustrating the processing of the display operation of the digital camera in a second embodiment.

FIG. 11 is a flowchart illustrating the processing of the display operation of the digital camera 100 in the second embodiment. The digital camera 100 of the present embodiment executes steps S1 to S13 as in the first embodiment, for example. As shown in FIG. 11, when the digital camera 100 is in the both display state Sd (YES in S9), the controller 180 determines whether or not to be during the shooting of a moving image (S14).

Before shooting a moving image (NO in S14), the controller 180 causes the display screen 222 of the movable monitor 220 to display an image as illustrated in FIG. 10 (S12), as in the first embodiment. On the other hand, during the shooting of a moving image, it is conceivable that the line of sight of the shooting subject person 55 would shift in the moving image under shooting by seeing the display on the display screen 222 of the movable monitor 220. To address this, when a moving image is under shooting (YES in S14), the controller 180 of the present embodiment deletes the image displayed on the display screen 222 (S15). Thus, the display of the movable monitor 220 to the shooting subject person 55 is prohibited during the shooting of a moving image.

As described above, in the present embodiment, when the shooting of a moving image is executed in a state where the image showing the subject is displayed on the movable monitor 220 and on the finder 250 simultaneously (YES in S14), the controller 180 deletes the image that the movable monitor 220 has been caused to display (S15). Thus, it is possible to avoid a situation in which the line of sight of the shooting subject person 55 is shifted due to the display on the display screen 222 of the movable monitor 220, during the shooting of a moving image.

Other Embodiments

As described above, the first and second embodiments are described as examples of the technique disclosed in the present application. However, the technique in the present disclosure is not limited thereto, and can also be applied to embodiments in which changes, substitutions, additions, omissions, and the like are made as appropriate. In addition, it is also possible to combine each component described in each of the above-described embodiments to form a new embodiment. Thus, in the following, other embodiments will be exemplified.

In the second embodiment described above, an example has been described where prohibiting the display of the movable monitor 220 to the shooting subject person 55 during the shooting of a moving image prevents the line of sight of the shooting subject person 55 from shifting. At this time, information display indicating that a moving image is under shooting may be performed to the shooting subject person 55 on the display screen 222 of the movable monitor 220. Such a modified example will be described with reference to FIG. 12.

Figure 12:
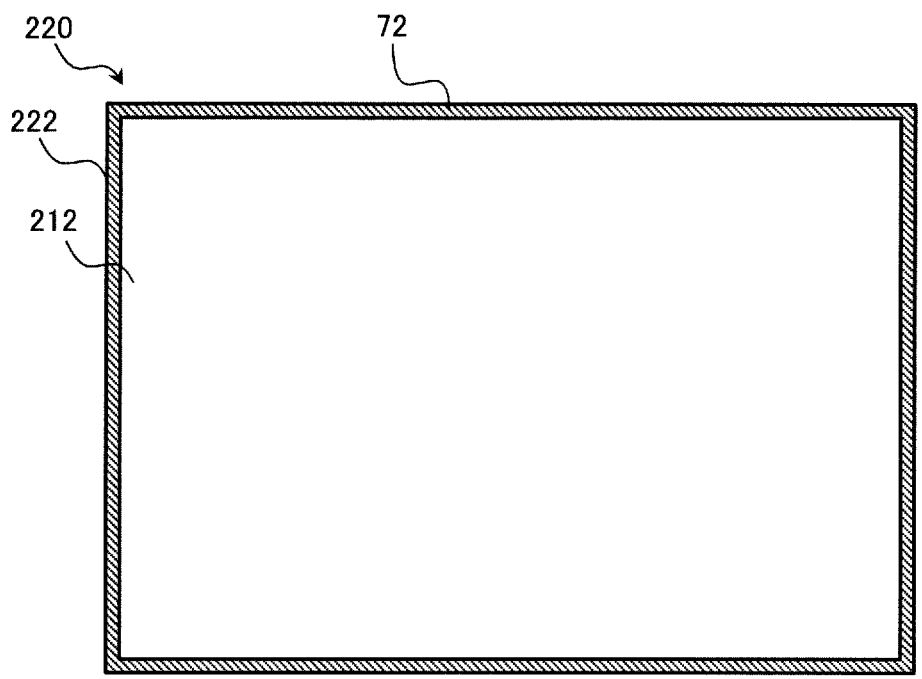
FIG. 12 is a diagram showing a display example in a both display state of a modified example of the second embodiment.

FIG. 12 is a diagram showing a display example in the both display state of the modified example of the second embodiment. In the present modified example, the controller 180 of the digital camera 100 performs the same steps S1 to S14 as in FIG. 11. Instead of performing step S15, the controller 180 causes the movable monitor 220 to perform highlighting suggesting that a moving image is under shooting, as exemplified in FIG. 12. Thus, even when the tally lamp 145 on the front side of the digital camera 100 as shown in FIG. 3 is not provided, the shooting subject person 55 can be caused to recognize whether or not a moving image is under shooting.

In the example in FIG. 12, the movable monitor 220 displays a red frame 72 on the display screen 222 with respect to the screen similar to step S15. The highlighting during shooting of the moving image is not limited to the red frame 72, and may be a frame of another color, an icon indicating a tally lamp such as a red circle, or the like.

As described above, when a predetermined condition is met (YES in S1 and S9), and when a moving image of the subject is under shooting (YES in S14), the controller 180 of the digital camera 100 may cause the movable monitor 220 to display information indicating that a moving image is under shooting, instead of an image showing the subject simultaneously with the finder 250. Thus, the shooting subject person 55 can check whether or not the moving image is under shooting while checking the through image 62, and it is possible to easily shoot the shooting subject person 55 using the digital camera 100.

In the above embodiments, as an example of the predetermined condition of the trigger for the movable monitor 220 and the finder 250 to shift to the both display state Sd, it is illustrated that the orientation of the display screen 222 is detected to be toward the subject side and the object is detected by the eye sensor 260. However, the predetermined condition is not limited to this. For example, the digital camera 100 may shift to the both display state Sd, with a preset user operation such as a pressing operation on a predetermined button in the operation interface 210 as a trigger. Also with this, in a shooting situation where, for example, there are a photographer 50 and a shooting subject person 55, inputting the above user operation allows information display useful for both persons to be performed as in the first embodiment.

As described above, the digital camera 100 of the present embodiment may further include an operation interface 210 for inputting a user operation. The predetermined condition of the both display state Sd may include that a predetermined user operation is input in the operation interface 210. For example, one of the fact that the orientation of the display screen 222 is detected to be toward the subject side and the fact that the object is detected by the eye sensor 260 may be replaced with the input of the above user operation.

In the above embodiments, an example of the mechanism of the movable monitor 220 has been described, but the present disclosure is not particularly limited thereto. For example, in addition to the movable mechanism 224 illustrated in FIGS. 2 and 3, the movable monitor 220 may be further provided with a tilt-up mechanism for the photographer to check the display screen 222 in various postures. At this time, the reversal sensor 230 may include a switch that switches on/off depending on whether or not the tilt-up mechanism is expanded. When this switch is on, the controller 180 may proceed to NO in steps S3 and S9 in FIG. 6.

In addition, the movable monitor 220 is not limited to the vari-angle method, and may be a tilt method, for example. Also in the tilt method, the reversing monitor display state Sb or the both display state Sd can be applied by detecting the state in which the movable monitor 220 includes the display screen 222 directed toward the subject side, that is, the movable monitor 220 is reversed.

In the above embodiments, the reversal sensor 230 using a switch is illustrated as an example of the orientation detector of the display screen 222 of the movable monitor 220, but the orientation detector is not limited to this. For example, the orientation detector of the present embodiment may be an angle sensor capable of continuously measuring various angles such as the opening and closing angle θ1 and the rotation angle θ2 of the display screen 222 of the movable monitor 220.

In the above embodiments, the digital camera 100 including the optical system 110 and the lens driver 120 is illustrated. The imaging apparatus of the present embodiment does not need to include the optical system 110 or the lens driver 120, and may be, for example, an interchangeable lens type camera.

In the above embodiments, a digital camera is described as an example of an imaging apparatus, but the present disclosure is not limited to this. The imaging apparatus of the present disclosure has only to be an electronic apparatus having an image capturing function (e.g., a video camera, a smartphone, a tablet terminal, or the like).

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The present disclosure is applicable to an imaging apparatus including a plurality of displays.

The invention claimed is:

1. An imaging apparatus for capturing an image of a subject, the imaging apparatus comprising:
   a first display;
   a second display including a display screen configured to change an orientation toward a subject side;
   a control circuit configured to control operations of the first and second displays; and
   a proximity sensor configured to detect an object in proximity to the first display,
   wherein when a predetermined condition is satisfied, the control circuit causes the first display to display an image of the subject, and causes the second display to display an image showing the subject simultaneously with the first display, and wherein when the orientation of the display screen is toward the subject side, the control circuit causes the second display to display the image showing the subject, and shooting information on image shooting of the subject, in a case where the object is not detected by the proximity sensor, and causes the second display to display the image showing the subject simultaneously with the first display, without displaying a part or a whole of the shooting information on the second display, in a case where the object is detected by the proximity sensor.

2. The imaging apparatus according to claim 1, further comprising an orientation sensor configured to detect whether or not the orientation of the display screen is toward the subject side, wherein the predetermined condition includes that the orientation of the display screen is detected to be toward the subject side.

3. The imaging apparatus according to claim 2, wherein the predetermined condition is that the orientation of the display screen is detected to be toward the subject side, and the object is detected by the proximity sensor.

4. The imaging apparatus according to claim 1, further comprising an orientation sensor configured to detect whether or not the orientation of the display screen is toward the subject side, wherein the control circuit switches whether or not to reverse an image to be displayed on the second display according to a detection result of the orientation sensor, when the object is not detected by the proximity sensor, and switches whether or not to cause the second display to display the image showing the subject simultaneously with the first display according to a detection result of the orientation sensor, when the object is detected by the proximity sensor.

5. The imaging apparatus according to claim 1, further comprising a user interface configured to input a user operation, wherein the predetermined condition includes that a predetermined user operation is input in the user interface.

6. The imaging apparatus according to claim 1, wherein when the predetermined condition is satisfied, the control circuit causes the first display to display the image of the subject and the shooting information on image shooting of the subject, and causes the second display to display the image showing the subject simultaneously with the first display, without displaying a part or a whole of the shooting information on the second display.

7. The imaging apparatus according to claim 1, wherein upon shooting of a moving image in a state where the image showing the subject is displayed on the second display simultaneously with the first display when the orientation of the display screen is toward the subject side, the control circuit deletes the image displayed on the second display.

8. An imaging apparatus for capturing an image of a subject, the imaging apparatus comprising:

a first display;

a second display including a display screen configured to change an orientation toward a subject side; and a control circuit configured to control operations of the first and second displays, wherein when a predetermined condition is satisfied, the control circuit causes the first display to display an image of the subject, and causes the second display to display an image showing the subject simultaneously with the first display, and during shooting a moving image of the subject when the predetermined condition is satisfied with the orientation of the display screen being toward the subject side, the control circuit causes the second display to display information indicating that the moving image is under shooting, instead of the image showing the subject simultaneously with the first display.

9. An imaging apparatus for capturing an image of a subject, the imaging apparatus comprising:

a first display including a first display screen facing a photographer in a direction opposite the subject;

a second display including a second display screen configured to change an orientation toward a subject side;

a control circuit configured to control operations of the first and second displays; and a user interface configured to input a user operation on the second display screen, wherein when the orientation of the second display screen is toward the subject side such that the second display screen faces the subject in a direction opposite the photographer, the control circuit causes the first display to display a first live view image of the subject, causes the second display to display a second live view image showing the subject simultaneously with the first display, and sets to disable the user operation on the second display screen in the user interface.

10. The imaging apparatus according to claim 1, wherein the first display is an electronic viewfinder, and the second display is a movable monitor.

11. An imaging apparatus for capturing an image of a subject, the imaging apparatus comprising:

a first display;

a second display including a display screen configured to change an orientation toward a subject side; and a control circuit configured to control operations of the first and second displays;

wherein when a predetermined condition is satisfied, the control circuit causes the first display to display an image of the subject, and causes the second display to display an image showing the subject simultaneously with the first display, wherein upon shooting of a moving image in a state where the image showing the subject is displayed on the second display simultaneously with the first display when the orientation of the display screen is toward the subject side such that a front side of the display screen faces the subject, the control circuit deletes the image displayed on the second display.

12. The imaging apparatus according to claim 9, further comprising a proximity sensor configured to detect an object in proximity to the first display, wherein when the orientation of the second display screen is toward the subject side and the object is detected by the proximity sensor, the control circuit causes the first display to display the first live view image of the subject, causes the second display to display the second live view image showing the subject simultaneously with the first display, and sets to disable the user operation on the second display screen in the user interface.

* * * * *